United States Patent
Rashidi et al.

(10) Patent No.: US 11,036,686 B2
(45) Date of Patent: Jun. 15, 2021

(54) DATA DEDUPLICATION IN A TRAVEL AND TRANSPORTATION DATA PROCESSING SYSTEM

(71) Applicant: Royal Caribbean Cruises Ltd., Miami, FL (US)

(72) Inventors: Sol Rashidi, Miami Beach, FL (US); Arya Eskamani, Miami, FL (US); Mallori Harrell, Miami, FL (US); Carlos Merida, Miami, FL (US)

(73) Assignee: ROYAL CARIBBEAN CRUISES LTD., Miami, FL (US)

( * ) Notice: Subject to any disclaimer, the term of this patent is extended or adjusted under 35 U.S.C. 154(b) by 302 days.

(21) Appl. No.: 16/127,201

(22) Filed: Sep. 10, 2018

(65) Prior Publication Data

US 2020/0081997 A1    Mar. 12, 2020

(51) Int. Cl.
| | |
|---|---|
| G06F 16/00 | (2019.01) |
| G06F 16/174 | (2019.01) |
| G06N 7/00 | (2006.01) |
| G06Q 10/02 | (2012.01) |
| G06N 20/00 | (2019.01) |

(52) U.S. Cl.
CPC ......... G06F 16/1748 (2019.01); G06N 7/00 (2013.01); G06N 20/00 (2019.01); G06Q 10/02 (2013.01)

(58) Field of Classification Search
CPC ...... G06F 16/1748; G06N 20/00; G06N 7/00; G06Q 10/02
See application file for complete search history.

(56) References Cited

U.S. PATENT DOCUMENTS

| | | | | |
|---|---|---|---|---|
| 2008/0228534 | A1* | 9/2008 | Sink | G06Q 10/025 705/6 |
| 2015/0134372 | A1* | 5/2015 | Lopez Ruiz | G06Q 10/02 705/5 |
| 2015/0294234 | A1* | 10/2015 | Alberola | G06Q 10/02 705/5 |

* cited by examiner

*Primary Examiner* — Jared M Bibbee
(74) *Attorney, Agent, or Firm* — Steven M. Greenberg, Esq.; Shutts & Bowen LLP

(57) ABSTRACT

A method, system and computer program product for data deduplication in a travel and transportation data processing system includes loading into memory for comparison from a database of a multiplicity of multi-field records, a pair of two different multi-field records and submitting the pair to a similarity model that correlates a companion passenger with a specified individual so as to indicate a probability of duplication whenever the companion passenger appears in a pair of records submitted to the model for comparison. Thereafter, if the model produces a high probability, the pair is automatically merged into a single record without manual intervention, but if the model produces a medium probability, the pair is placed in a queue pending manual intervention and manual merging, and if the similarity model produces a low probability, the pair is omitted from consideration of merging. Finally, the process repeats for each other pair of different multi-field records in the database.

9 Claims, 2 Drawing Sheets

DATA DEDUPLICATION IN A TRAVEL AND TRANSPORTATION DATA PROCESSING SYSTEM

BACKGROUND OF THE INVENTION

Field of the Invention

The present invention relates to the field of data deduplication and more particularly to passenger record deduplication for travel and transportation data processing.

Description of the Related Art

Data deduplication is a technique for eliminating redundant data. In the deduplication process, duplicate data is deleted, leaving only one copy of the data to be stored. Depending upon the type of deduplication, redundant files, or even portions of other data that is similar, can be reduced or removed. Data deduplication oftentimes is associated with data compression so as to require a restoration process. As such, in data deduplication for the purpose of restorable compression, only data plainly known to be duplicates of one another is subjected to the deduplication process. So much is not true when data deduplication is performed for the sole purpose of irretrievable compression as a maximum reduction in the size of the data corpus is always sought.

In data deduplication, disparate records may not be identical in terms of the content of each field, but specific fields within a record may represent a duplicate of those same fields in other records. However, minor changes in the content of a particular field may indicate that two different fields in two different records are indeed different, when in fact the two different fields contain the same reference despite some disparity in the information present in the two different fields. In this circumstance, during data deduplication both records will be considered unique and omitted from the deduplication action, whether such action is a deletion of one of the records in favor of the other, or a merger of the content of both records.

The foregoing problem arises often in the field of travel and transportation. In the field of travel and transportation, each record in a data processing system commonly is associated with a specific individual traveler or passenger. Across the expanse of one or more enterprise systems, many different records pertaining to many different aspects of a travel or transportation operation are generated and updated in connection with a specified individual. The association between the specified individual and corresponding data generally requires the manual entry by an operator of the specified individual, which of course, lends itself to human error. Consequently, oftentimes multiple different records exist in the enterprise system referring to different individuals when the intent had been to associate the multiple different records with a single individual. To the extent that such a problem becomes pervasive throughout the enterprise collection of data processing systems, a deduplication process would be desirable in merging errantly duplicative records pertaining to different travelers and passengers who in fact are the same person.

BRIEF SUMMARY OF THE INVENTION

Embodiments of the present invention address deficiencies of the art in respect to data deduplication and provide a novel and non-obvious method, system and computer program product for data deduplication in a travel and transportation data processing system. In an embodiment of the invention, a method for data deduplication in a travel and transportation data processing system includes loading into memory for comparison from a database of a multiplicity of multi-field records, a pair of two different multi-field records and submitting the pair to a similarity model that correlates values for different fields of the multiplicity of multi-field records with a single person and produces a probability of duplication responsive to the submission by correlating a companion passenger with a specified individual so as to indicate a probability of duplication whenever the companion passenger appears in a pair of records submitted to the model for comparison.

Thereafter, on condition that the similarity model produces a high probability, the pair is automatically merged into a single record without manual intervention, but otherwise on condition that the similarity model produces a medium probability, the pair is placed in a queue pending manual intervention and manual merging, and even otherwise, on condition that the similarity model produces a low probability, the pair is omitted from consideration of merging. Finally, the submitting, and one of the automatic merging, placing and omitting may be repeated for each other pair of different multi-field records in the database. In one aspect of the embodiment, the model is a machine learning model trained on different correlated pairs of records. As well, in another aspect of the embodiment, the model is trained by feeding back into the model, each pair of records processed manually from the queue.

In another embodiment, a travel and transportation data processing system is configured for data deduplication. The system includes a host computer with memory and at least one processor, a fixed storage medium hosting a database of a multiplicity of multi-field records and a similarity model disposed in the memory. The similarity model correlates values for different fields of the multiplicity of multi-field records with a single person and produces a probability of duplication responsive to the submission. Finally, the system includes a data deduplication module that includes computer program instructions enabled upon execution in the memory of the host computer to load into the memory for comparison from the database, a pair of two different multi-field records, to submit the pair to the model and on condition that the similarity model produces a high probability, to automatically merge the pair into a single record without manual intervention, but otherwise on condition that the similarity model produces a medium probability, to place the pair in a queue pending manual intervention and manual merging, but otherwise on condition that the similarity model produces a low probability, to omit the pair from consideration of merging. Finally, the program instructions are enabled to repeat the process for each other pair of different multi-field records in the database.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for data deduplication in a travel and transportation data processing system. In accordance with an embodiment of the invention, different pairs of multi-field records in a travel and transportation data processing system are loaded into memory for comparison and provided as input to a model. The model produces a probability of a duplicate pair based upon known correlations between different fields in each record—namely by correlating one or more companion passengers with a specified individual so as to indicate a probability of duplication whenever the companion passenger or passengers appear in a pair of records submitted to the model for comparison. To the extent that the model determines a high probability of a duplicate pair, the pair of records are merged into a single record. To the extent that the model determines a low probability of a duplicate pair, the pair of records are discarded as a candidate for merger. Finally, to the extent that the model determines a medium probability of a duplicate pair, the pair of records are placed in a queue for manual review by an operator. This process may repeat for all records in the travel and transportation data processing system so as to effectuate an automated and effective deduplication of non-identical records deemed to have a likelihood of duplication.

Figure 1:
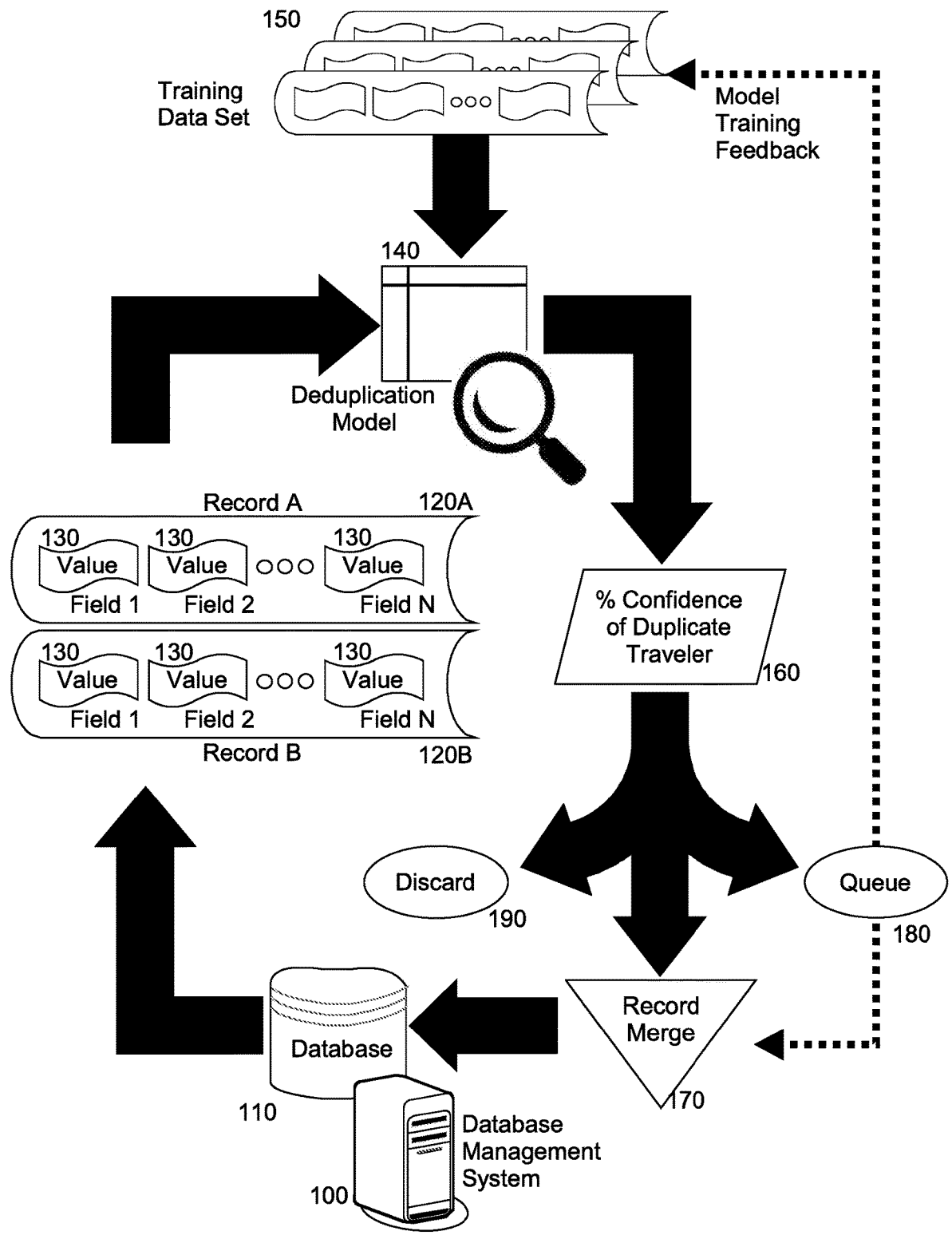
FIG. 1 is pictorial illustration of a process for data deduplication in a travel and transportation data processing system.

In further illustration, FIG. 1 pictorially shows a process for data deduplication in a travel and transportation data processing system. As shown in FIG. 1, different multi-field records 150 in a training data set are provided to a model 140 so as to train the model 140 to produce a probability of any two of the records 150 referencing the same traveler. More particularly, though the records 150 in the training data set may differ in the content of different fields of the records 150, a correlation may be established by the model 140 between the presence of particular values for particular fields indicative that the corresponding one of the records 150 refers to a particular traveler. Examples include a reference to one or more other travelers as traveling companions, a particular address, or a particular type of traveling arrangement such as seat, cabin, port of embarkation, destination port and the like. In this way, once training the deduplication model 140, upon comparing two different records, may compute a probability that two different records refer to the same traveler even though different values for different fields, including a field identifying the traveler, may differ.

Once the deduplication model 140 has been trained with records 150 of the training data set, different pairs of records 120A, 120B of multiple fields 130 stored within database 110 managed by database management system 100 may be provided to the deduplication model 140. In response, the deduplication model 140 produces a confidence 160 as to whether the pair of records 120A, 120B refer to the same traveler based upon identical values of particular ones of the fields 130 correlated to the same traveler. To the extent that the confidence 160 exceeds a high threshold value indicating a strong likelihood that the pair of records 120A, 120B refer to the same traveler, an automated record merge 170 may be performed upon the pair of records 120A, 120B. But, to the extent that the confidence 160 falls below a low threshold value indicating a likelihood that the pair of records 120A, 120B refer to different travelers, the pair of records 120A, 120B are discarded an a next pair of records 120A, 120B retrieved for analysis.

However, to the extent that the confidence 160 while exceeding the low threshold value, falls short of the high threshold value, the pair of records 120A, 120B are placed in a queue 180 for manual determination of whether or not the records 120A, 120B refer to the same traveler. if the manual review results in the record merge 170 of the pair of records 120A, 120B, the pair of records 120A, 120B are then submitted to the deduplication model 140 as additional records 150 in the training data set so as to constantly refine the deduplication model 140.

Figure 2:
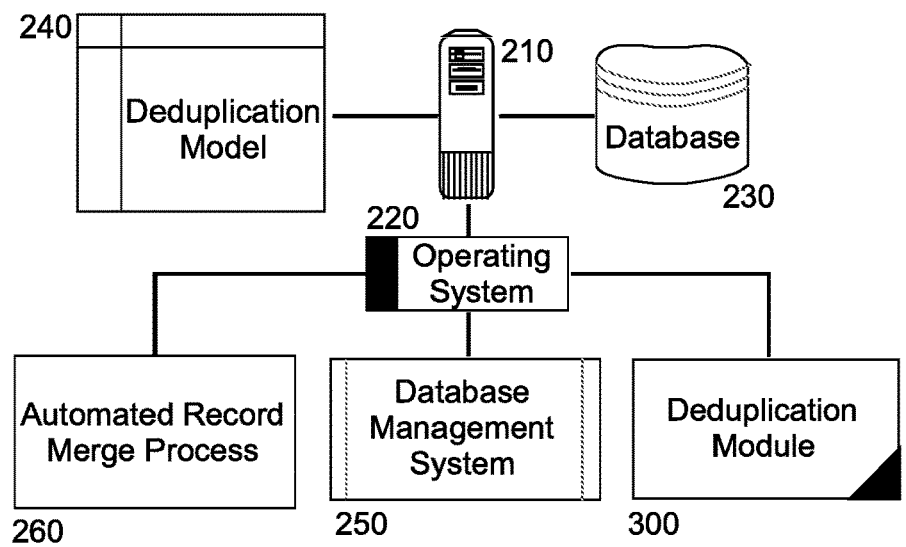
FIG. 2 is a schematic illustration of a travel and transportation data processing system configured for data deduplication; and, FIG. 3 is a flow chart illustrating a process for data deduplication in a travel and transportation data processing system.

The process described in connection with FIG. 1 may be implemented in a travel and transportation data processing system. In further illustration, FIG. 2 is a schematic illustration of a travel and transportation data processing system configured for data deduplication. The system includes a host computing system 210 that may include one or computers, each with memory and at least one processor. The host computing system 210 supports the execution of an operating system 220 which in turn manages the operation of a database management system 250 managing access to different records (not shown) in a database 230 coupled to the host computing system 210. The database management system 250 provides at least functionality permitting the addition of new records to the database 230, the deletion of records from the database 230, and the updating of records present in the database 230 including the merger of two different records into a single record.

In respect to the merger of two different records into a single record, an automated record merge process 260 is included as part of the functionality of the database management system 250. The automated record merge process 260 processes two different records of common fields and identifies both identical values and differing values. The merged record incorporates the identical values in the corresponding values, and for fields of differing values of the two different records, a preferred one of the values is stored in the corresponding field. For example, to the extent that a field referring to a name of a traveler is similar but different in each of the two different records, the automated record merge process 260 selects a preferred form of the name for the corresponding field of the merged record.

Notably, a deduplication model 240 is stored in the memory of the host computing system 210. The deduplication model 240 can be a machine learning deep neural network trained with a set of record pairs known to be associated with a same traveler based upon a correlation between identical values in particular fields of the record pairs, such as a common travel companion referenced in one of the particular fields of the record pairs. As such, the deduplication model 240 is adapted to produce a confidence value or probability that any two records provided as input to the deduplication model 240 produce as output a probability value of the two records referring to the same traveler.

Finally, the system includes a deduplication module 300. The deduplication module 300 includes computer program instructions that execute in the memory of the host computing system 210. During execution, the computer program instructions of the deduplication module 300 repeatedly selects different record pairs in the database 230 through the database management system 250 and submits each selected record pairs to the deduplication model 240 in order to receive in response, a confidence value. On the condition that the confidence value exceeds a high threshold value established in the deduplication module 300, the program instructions direct the automated record merge process 260 to merge the records in the selected record pair. However, on the condition that the confidence value does not exceed the high threshold; but, exceeds a low threshold value established in the deduplication module 300, the program instructions enqueue the record pair for manual review which may or may not result in a manual direction of the automated record merge process 260 to merge the record pair. Finally, on the condition that the confidence value does not exceed the low threshold value, the program instructions discard the record pair from consideration as a record merge candidate.

Figure 3:
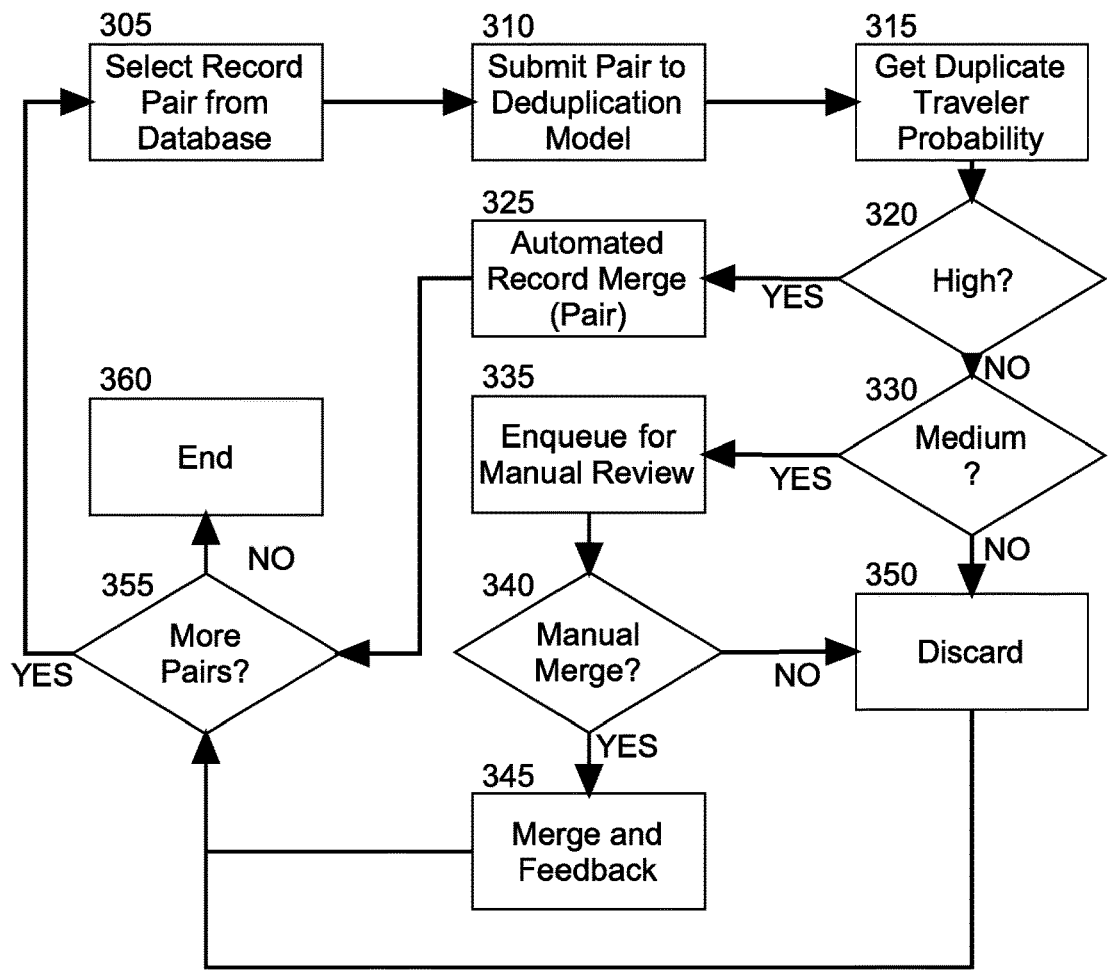

In even yet further illustration of the operation of the deduplication module 300, FIG. 3 is a flow chart illustrating a process for data deduplication in a travel and transportation data processing system. Beginning in block 305, a record pair is selected from the database and in block 310, the record pair is submitted to the deduplication model. Thereafter, in block 315, a duplicate traveler probability is received from the deduplication model.

In decision block 320, it is determined if the duplicate traveler probability exceeds a high threshold value. If so, in block 325, the record pair is submitted to the record merge process for merger. Otherwise, in decision block 330, it is determined if the duplicate traveler probability exceeds a low threshold value. If not, in block 350 the record pair is discarded. But, in decision block 330, if it is determined that the duplicate traveler probability exceeds the low threshold value, in block 335 the record pair is enqueued for later manual review by an operator. In decision block 340, if the operator selects a manual merge of the record pair, the records of the record pair are merged and the records are provided to the deduplication model as feedback training data. Otherwise, the record pair is discarded.

In decision block 355, the record pair having been fully processed, it is determined if additional record pairs remain to be analyzed in the database. If so, the process begins anew at block 305 with the selection of a new pair of records. But, in decision block 355, when it is determined that no record pairs remain for analysis, the process ends in block 360.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for data deduplication in a travel and transportation data processing system, the method comprising:
   loading into memory for comparison from a database of a multiplicity of multi-field records, a pair of two different multi-field records;
   submitting the pair to a similarity model, the similarity model correlating values for different fields of the multiplicity of multi-field records with a single person and producing a probability of duplication responsive to the submission by correlating a companion passenger with a specified individual so as to indicate a probability of duplication whenever the companion passenger appears in a pair of records submitted to the model for comparison;
   on condition that the similarity model produces a high probability, automatically merging the pair into a single record without manual intervention, but otherwise on condition that the similarity model produces a medium probability, placing the pair in a queue pending manual intervention and manual merging, but otherwise on condition that the similarity model produces a low probability, omitting the pair from consideration of merging; and,
   repeating the submitting, and one of the automatic merging, placing and omitting for each other pair of different multi-field records in the database.

2. The method of claim 1, wherein the model is a machine learning model trained on different correlated pairs of records.

3. The method of claim 1, further comprising training the model by feeding back into the model, each pair of records processed manually from the queue.

4. A travel and transportation data processing system configured for data deduplication, the system comprising:
   a host computer with memory and at least one processor;
   a fixed storage medium hosting a database comprising a multiplicity of multi-field records;
   a similarity model disposed in the memory, the similarity model correlating values for different fields of the multiplicity of multi-field records with a single person and producing a probability of duplication responsive to the submission by correlating a companion passenger with a specified individual so as to indicate a probability of duplication whenever the companion passenger appears in a pair of records submitted to the model for comparison; and,
   a data deduplication module comprising computer program instructions enabled upon execution in the memory of the host computer to perform:
   loading into the memory for comparison from the database, a pair of two different multi-field records;
   submitting the pair to the model;
   on condition that the similarity model produces a high probability, automatically merging the pair into a single record without manual intervention, but otherwise on condition that the similarity model produces a medium probability, placing the pair in a queue pending manual intervention and manual merging, but otherwise on condition that the similarity model produces a low probability, omitting the pair from consideration of merging; and,
   repeating the submitting, and one of the automatic merging, placing and omitting for each other pair of different multi-field records in the database.

5. The system of claim 4, wherein the model is a machine learning model trained on different correlated pairs of records.

6. The system of claim 4, wherein the program instructions during execution are enabled to further perform training the model by feeding back into the model, each pair of records processed manually from the queue.

7. A computer program product for data deduplication in a travel and transportation data processing system, the computer program product including a non-transitory computer readable storage medium having program instructions embodied therewith, the program instructions executable by a device to cause the device to perform:
   loading into memory for comparison from a database of a multiplicity of multi-field records, a pair of two different multi-field records;
   submitting the pair to a similarity model, the similarity model correlating values for different fields of the multiplicity of multi-field records with a single person and producing a probability of duplication responsive to the submission by correlating a companion passenger with a specified individual so as to indicate a probability of duplication whenever the companion passenger appears in a pair of records submitted to the model for comparison;
   on condition that the similarity model produces a high probability, automatically merging the pair into a single record without manual intervention, but otherwise on condition that the similarity model produces a medium probability, placing the pair in a queue pending manual intervention and manual merging, but otherwise on condition that the similarity model produces a low probability, omitting the pair from consideration of merging; and,
   repeating the submitting, and one of the automatic merging, placing and omitting for each other pair of different multi-field records in the database.

8. The computer program product of claim 7, wherein the model is a machine learning model trained on different correlated pairs of records.

9. The computer program product of claim 7, wherein the program instructions executable by the device cause the device to further perform training the model by feeding back into the model, each pair of records processed manually from the queue.

\* \* \* \* \*